Dec. 18, 1934. A. J. GAINES 1,984,676
MIRROR SUPPORTING DEVICE
Filed Nov. 16, 1933
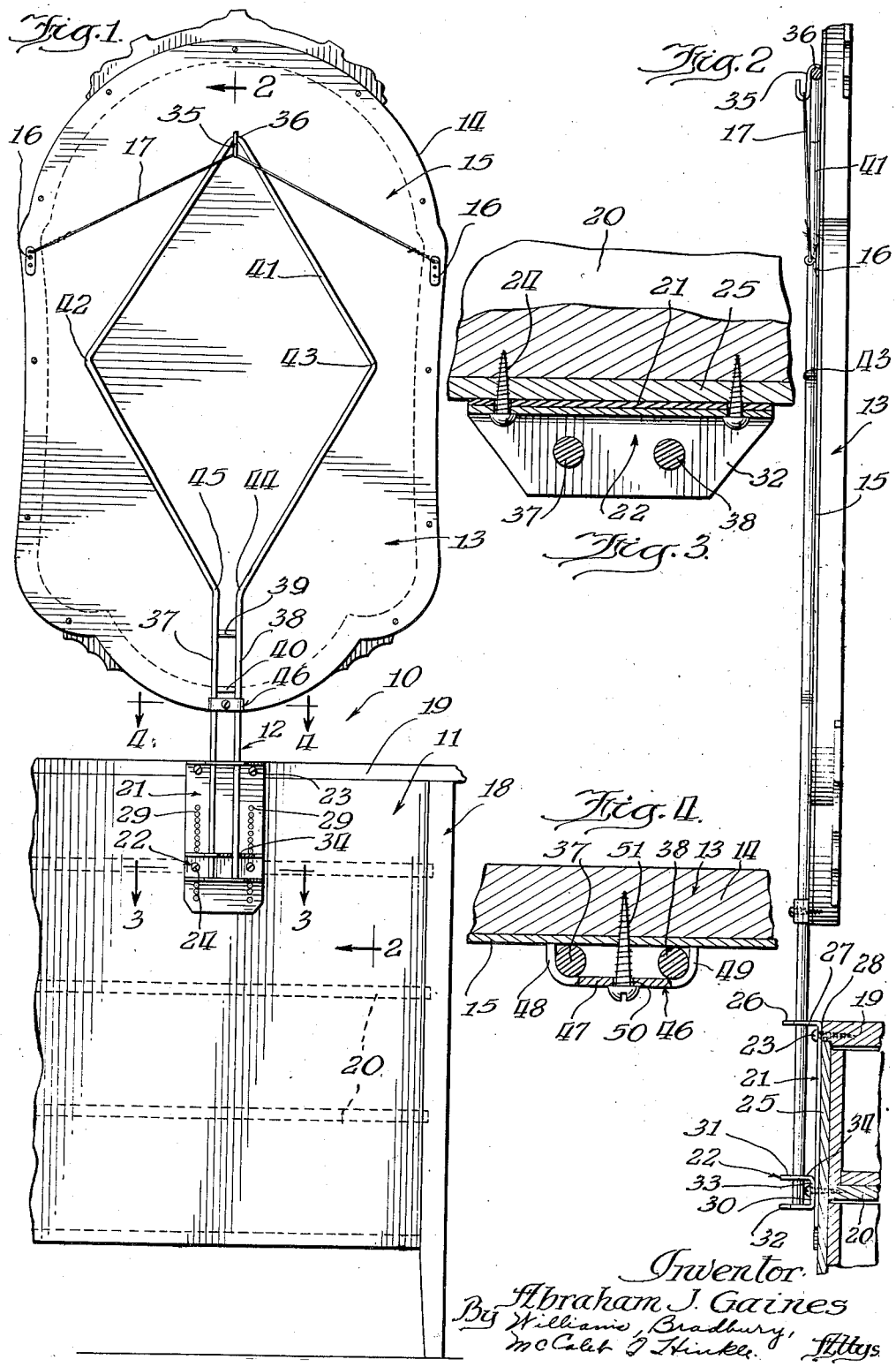
Inventor
Abraham J. Gaines
By Williams, Bradbury,
McCaleb & Hinkle, Attys.

Patented Dec. 18, 1934

1,984,676

UNITED STATES PATENT OFFICE 1,984,676

MIRROR SUPPORTING DEVICE

Abraham J. Gaines, Chicago, Ill.

Application November 16, 1933, Serial No. 698,274

7 Claims. (Cl. 45—88)

The present invention relates to mirror supporting devices, and is particularly concerned with dresser, vanity, or other furniture installations of the type having a mirror which in the past has been mounted upon the wall of the room above the dresser, disconnected from the vanity or dresser. The device is of general application, however, and may be utilized for suporting various framed articles having glass or other frangible parts like a mirror, and I do not wish to be limited to the specific use illustrated in this application.

In the devices of the prior art it has been customary to support such mirrors in the stock room or display room by means of a stiff strip of lumber, which was firmly secured to the back of the vanity or dresser at its lower end and which was secured to the mirror at the upper edge of the frame and the lower edge of the frame by wood screws passing through the lumber strip into the frame of the mirror. Such an installation, however, was not suitable for use in the home, and it had many disadvantages for use in a stock room or display room.

When a dresser is, for example, being displayed to a customer, the salesman often grasps one end of the dresser top and lifts the dresser out on the display floor for the purpose of showing more of the dresser apart from the adjacent pieces of furniture. The lumber devices used for supporting the mirror were not adequate to withstand such handling, and in some cases the mirror would work loose from its fastenings, due to the width and weight of the mirror and to the frailty of the securing devices, which were only at the middle of the mirror. Furthermore, the lumber installation was so stiff and rigid that when the dresser or other article was handled, the movement or shock of the dresser often resulted in the breaking of a large mirror, and one of the objects of the present invention is to eliminate the troubles caused by the devices of the prior art.

Another object of the invention is the provision of an improved supporting bracket which is adapted to be secured to the back of a dresser or vanity and to the back of a separate mirror or the like for the purpose of supporting the separate mirror on the dresser, either for a display room or for the home.

Another object is the provision of a device of the class described, the securing devices of which are readily adjustable to different types of dressers or vanities having drawers of different depths, and which are adjustable for use with mirrors of different sizes.

Another object is the provision of a supporting bracket of the class described which has flexible and resilient characteristics from the point of view of a cantilever, and which also has flexible and resilient characteristics from the point of view of torsional strain to prevent shocks to the mirror, either from forward or backward movements of the dresser or turning movements of the dresser.

Another object is the provision of a device of the class described which is adapted to hold the mirror firmly yet resiliently against turning movement with respect to the bracket and dresser so that the mirror is secured substantially parallel to the plane of the back of the dresser without any possibility of the mirror swinging, swaying, or otherwise becoming sufficiently loose, to present possibility of breakage.

Another object of the invention is the provision of an improved supporting bracket of the class described which is sturdy and serviceable, yet capable of economical manufacture, so that it may be sold at a price which places it within the means of a vast number of users either for the home or display room.

Other objects and advantages of the invention will be apparent from the following description and the accompanying drawing, in which similar characters of reference represent similar parts throughout the several views.

Referring to the single sheet of drawings accompanying the specification:

Fig. 1 is a rear elevational view of a dresser-mirror installation employing a supporting device constructed according to the present invention, a portion of a flange of an attaching plate being broken away;

Fig. 2 is an enlarged side elevational view in partial section, taken on the plane of the line 2—2 of Fig. 1, with a part of the rod in section, and the dresser shown in section;

Fig. 3 is a horizontal sectional view taken on the plane of the line 3—3 of Fig. 1, looking in the direction of the arrows, showing the details of the adjustable securing plates;

Fig. 4 is a fragmentary sectional view taken on the plane of the line 4—4 of Fig. 1, looking in the direction of the arrows, showing the details of construction of the clamping member which secures the legs of the supporting rod to the mirror.

Referring to Fig. 1, 10 indicates in its entirety an installation constructed according to the present invention, including, for example, a dresser 11, a connecting device 12, and a mirror 13. While the present device is of particular importance in connection with relatively large mirrors, it may be used for any size of mirror or any framed article which it is desirable to support in a similar manner. The mirror is usually provided with an outer frame 14 which is rabbeted at its rear side to receive the mirror and which is covered at its back with a back board 15, usually of plywood.

The mirrors are customarily provided with hooks or eyes or apertured wire securing plates 16 at each side, and a wire, cord or other flexible securing member 17 is secured to each of the hooks or plates 16 at its end, and has an amount of slack which is determined by the height at which it is desired to support the mirror, and is sometimes also used to regulate the tilt of the mirror.

The dresser is preferably of the type having the supporting frame 18 which carries the dresser top 19 and a plurality of drawer partitions 20, the spacing of which varies in dressers or vanities of different types.

In order to provide for the securement of the present device to dressers or vanities having the drawer partitions differently spaced, I prefer to utilize a pair of supporting plates 21, 22, which may be adjusted with respect to each other so that the upper securing screws 23 may be driven directly into the back of the dresser top 19 and the lower securing screws 24 may be driven directly through the back 25 of the dresser into the first drawer partition 20.

The supporting plate 21 may consist of a flat sheet metal member preferably constructed of steel, having its main body of sufficient length to extend from the top of the dresser down past the first partition, and the length should be sufficient to take care of dressers having the deepest upper drawers that may be encountered.

At its upper end the body of the plate 21 is provided with a backwardly turned flange 26 which extends at substantially right angles to the body of the plate 21 and is provided with a pair of circular apertures 27.

The supporting device 12 is preferably constructed of round stock steel rod, and for this reason the apertures 27 are made circular and of substantially complementary size to the rod, but the device might be constructed of square, hexagonal, or any other geometrical shape of stock, and in such case the apertures 27 would also be of complementary shape.

The supporting plate 21 is preferably substantially rectangular in shape, and is provided with two or more screw apertures 28 adjacent its upper end to receive the screws 23 which are driven into the dresser top 19. A multiplicity of additional screw apertures 29 are also formed in the plate 21, the apertures being arranged in two rows extending vertically and being located sufficiently close together to permit as close adjustment as possible without seriously weakening the metal plate. One of the apertures 29 will be in substantial registration with the upper drawer partition 20 in any ordinary dresser when the upper apertures 28 are located in substantial registration with the middle of the dresser top 19.

The lower supporting plate 22 preferably comprises a sheet metal member which may be formed of a plate of steel of substantially rectangular shape having a flat central body 30 and a pair of rearwardly directed flanges 31 and 32 at the top and bottom thereof.

The body of the plate 22 preferably has a pair of apertures 33 of sufficient size to receive the securing screws 24 which pass through the plate 22 and also through the plate 21 into the upper drawer partition 20. The same screws which secure the plate 22 in place also secure the plate 21, and by means of a multiplicity of screws 23, 24 both plates are firmly secured to the back of the dresser.

The upper flange 31 of plate 22 is at substantially right angles to the body 30 of the plate, and is preferably provided with a pair of circular apertures 34 like the apertures 27 in the flange 26 and complementary to the rod of which the supporting device 12 is constructed. The lower flange 32 also extends at substantially right angles to the body 30 of plate 22, but is not apertured, as it provides a support for the ends of the rods of which the supporting bracket 12 is constructed.

The supporting device 12 for the mirror preferably consists of a metal member which is preferably constructed of stock metal rods such as steel rods, having sufficient resiliency to prevent shock to the mirror, but also being sufficiently stiff to hold the mirror in proper position.

In one embodiment of the invention the device 12 has been constructed of three-eighths inch steel rod. At its upper end the supporting device 12 is preferably provided with a hook 35, the upper end 36 of which is preferably welded, or otherwise fixedly secured to the supporting device 12, with the hook extending toward the back in such manner as to engage and support the wire 17.

The supporting device 12 preferably consists of a pair of separate legs 37, 38 integrally joined at the upper end 36, and the legs 37, 38 preferably extend substantially parallel to each other at their lower portions, so that they may be slid into the apertures 27, 34 of the plates 21 and 22 to make the mirror conveniently removable from the dresser without the necessity for using any tools. Thus the parallel portions of the legs 37, 38 are preferably of sufficient length to extend the length of the plate 21, plus the usual space which is between the mirror and the dresser, plus an additional length utilized for adjustment of the height of the mirror.

The apertures 27, 34 in the plates 21, 22 are spaced horizontally from each other a distance which is equal to the spacing of the legs 37, 38, and the legs 37, 38 slide into the apertures 27, 34 and come to rest upon the lower flange 32. One or more bracing struts 39, 40 are preferably secured between the legs 37, 38 by butt welding the struts 39, 40 to the legs 37, 38, these struts being also constructed of steel rods and serving to stiffen the entire supporting device 12.

In order to provide for the firm securement of the mirror against torsional movement or twisting on the device 12, I prefer to shape the upper portion 41 of the supporting device 12 in such manner that the outermost points 42, 43 of this device extend out toward the edges of the mirror. The distance between the points 42, 43 should be such that they will be concealed behind the mirrors of the smallest size with which the device is intended to be used, but these points should be out as far as possible to the edge of the larger mirrors so as to give rods 12 more leverage to resist torsional forces on the mirror.

The actual shape of the upper part 41 may take a number of convenient forms, as it will be evident that this portion might be made of rectangular, square, circular or other geometric shapes, without failing to accomplish similar results, although the present shape is preferred.

Thus the frame of the rod is bent outward at an obtuse angle at the points 44, 45 at the upper ends of the legs 37, 38 and again bent inward at obtuse angles at the points 42, 43, being joined together at an acute angle at the point 36. This makes the upper portion 41 of substantially diamond shape, and utilizes a minimum amount of rod stock to accomplish the result of having the mirror supporting point 36 at the highest point and having the points of engagement 42, 43 as widely spaced as possible and adjacent the outer edges of the mirror.

As previously stated, the mirror is supported on the frame 12 by its wire 17 in the hook 35. The mirror is also preferably firmly secured to the frame 12 at the bottom by means of a clamping member 46, which may comprise a sheet metal member constructed preferably of steel or other strong material of substantially rectangular shape, having its main body provided with inwardly extending curved flanges 48, 49 of shape substantially complementary to the outer shape of the rods 37, 38.

The flanges 48, 49 may diverge slightly from each other in a direction away from the body 47 so that as they are forced home on the rods 37, 38 they may tend to draw rods 37, 38 together and against the back 15 of mirror 13.

The clamping member 46 is provided with an aperture 50 for receiving the wood screw 51 which passes through it, and is driven home into the frame 14 of mirror 13.

In some embodiments of the invention the clamping member 46 need not necessarily draw the rods 37, 38 toward each other, but are merely utilized to engage the rods 37, 38 and firmly secure them to the back of the mirror 13. In such case the rods are suitably supported so that they will readily slide in and out of the apertures 27, 34 of the back plates 21, 22. In other embodiments of the invention the clamping member 46 may be utilized for application to the mirror after the rods have been placed in their apertures in the back plates. By drawing the rods together they may be caused to bind in the apertures 27, 34, which will more firmly secure the rods in the back plates, but under such conditions it would be necessary or desirable to loosen the screw 51 when sliding the rods in or out of the apertures in the back plates.

The present device was first constructed for the purpose of supporting mirrors in show rooms to prevent the breakage of the mirrors which was caused by the defects of the lumber strips previously employed, but a marked demand has sprung up for the use of these devices in the homes as well as the show rooms.

The present device supports the mirror with sufficient firmness to be suitable for any type of installation, and the legs 37, 38 of the rod are the only part of the device which is visible from the front, making the device hardly noticeable. The mirror is more firmly supported than when it is mounted on the wall by its usual wire, and it is unnecessary to drive nails, hooks or other securing devices into the wall or to have wires visible above the mirror, such as are necessary when the mirror hangs from the picture molding. The dresser can be moved about the room with its mirror as much as desired without changing any fastening devices, and the mirror may be quickly removed from the dresser, when it is necessary, for shipping a device, or for moving.

One of the most important features of the invention is that characteristic of the combination whereby the resilient support prevents the breakage of the mirrors. The support is sufficiently flexible and resilient torsionally to permit turning of the dresser without such shock to the mirror that it may be broken, and also to permit forward or backward movements without possibility of breaking the mirror. At the same time, the mirror is supported firmly against swinging or swaying or turning upon its support, and the present devices have met with marked commercial success.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. In a mirror supporting device, an attaching plate for a dresser comprising a metallic member having apertures for receiving attaching devices connected to the top of a dresser, said member having a multiplicity of other apertures located to receive attaching devices secured to a drawer partition, said multiplicity of apertures adapting said plate for drawer partitions of different location, a resilient metal supporting member removably secured to said plate, and a mirror fixedly mounted on said supporting member at its upper end.

2. In a mirror supporting device, an attaching plate for a dresser comprising a metallic member having apertures for receiving attaching devices connected to the top of a dresser, said member having a multiplicity of other apertures located to receive attaching devices secured to a drawer partition, said multiplicity of apertures adapting said plate for drawer partitions of different location, a second securing plate secured to said dresser with the same securing devices, both said securing plates having laterally extending apertured flanges, a metal frame member having depending legs extending into the apertures of said flanges, and a mirror carried by the upper end of said metal frame member.

3. In a mirror supporting device, an attaching plate for a dresser comprising a metallic member having apertures for receiving attaching devices connected to the top of a dresser, said member having a multiplicity of other apertures located to receive attaching devices secured to a drawer partition, said multiplicity of apertures adapting said plate for drawer partitions of different location, a second securing plate secured to said dresser with the same securing devices, both said securing plates having laterally extending apertured flanges, a metal frame member having depending legs extending into the apertures of said flanges, and a mirror carried by the upper end of said metal frame member, said second metal securing plate having another laterally extending flange located below the first flange and engaging and supporting said legs.

4. A mirror supporting device comprising vertically extending rods which are parallel for a portion of their length and which are joined at their upper ends, a hook carried by the upper juncture of said rods for supporting a mirror, said rods being bent outward at an intermediate point to engage the back of the mirror adjacent the edges of the mirror, and a metal clamping member having a pair of flanges for engaging said parallel portions and having an aperture for receiving a securing device to fixedly secure said clamping member and rods to said mirror.

5. A mirror supporting device comprising vertically extending rods which are parallel for a portion of their length and which are joined at their upper ends, a hook carried by the upper juncture of said rods for supporting a mirror, said rods being bent outward at an intermediate point to engage the back of the mirror adjacent the edges of the mirror, and a metal clamping member having a pair of flanges for engaging said parallel portions and having an aperture for receiving a securing device to fixedly secure said clamping member and rods to said mirror, and a metal securing device having apertures registering with said parallel portions, and being adapted to be carried by a dresser for slidably and removably receiving the parallel portions to removably support a mirror thereon.

6. In a mirror supporting device, an attaching plate for a dresser comprising a metallic member having apertures for receiving attaching devices connected to the top of a dresser, said plate having a multiplicity of other apertures located to receive attaching devices secured to a drawer partition, said multiplicity of apertures adapting said plate for drawer partitions of different location, and a second metal plate adapted to be secured by said securing devices, each of said plates having a transversely extending flange, one of said flanges being apertured to receive a mirror supporting device resting on the other of said flanges.

7. In a mirror supporting device, a metallic rod member having two upwardly extending legs located adjacent each other, a brace for securing said legs together at a point spaced from their ends, each of said legs being bent laterally outward to engage a mirror back and said legs being joined together at the top of said device, and a mirror supporting hook carried adjacent the top of said device.

ABRAHAM J. GAINES.